(12) United States Patent
Yu et al.

(10) Patent No.: US 12,126,028 B2
(45) Date of Patent: Oct. 22, 2024

(54) CATALYST FOR ELECTROCHEMICAL CELL AND METHOD OF MANUFACTURING SAME

(71) Applicants: Hyundai Motor Company, Seoul (KR); Kia Corporation, Seoul (KR); Industry-University Cooperation Foundation Hanyang University ERICA Campus, Gyeonggi-do (KR)

(72) Inventors: Jung Han Yu, Gyeonggi-do (KR); Joo Young Kim, Gyeonggi-do (KR); Tae Joo Park, Gyeonggi-do (KR); Dae Woong Kim, Gyeonggi-do (KR); Min Ji Lee, Gyeonggi-do (KR)

(73) Assignees: Hyundai Motor Company, Seoul (KR); Kia Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 277 days.

(21) Appl. No.: 17/724,189

(22) Filed: Apr. 19, 2022

(65) Prior Publication Data

US 2022/0344673 A1 Oct. 27, 2022

(30) Foreign Application Priority Data

Apr. 23, 2021 (KR) .................. 10-2021-0053078

(51) Int. Cl.
*H01M 4/86* (2006.01)
*C25B 9/19* (2021.01)
(Continued)

(52) U.S. Cl.
CPC ............. *H01M 4/8657* (2013.01); *C25B 9/19* (2021.01); *C25B 11/053* (2021.01);
(Continued)

(58) Field of Classification Search
CPC . B01J 21/18; B01J 21/063; B01J 23/40; B01J 23/52; B01J 35/33; B01J 37/0223;
(Continued)

(56) References Cited

U.S. PATENT DOCUMENTS 4,444,642 A * 4/1984 Hinden ................. C25B 11/093
427/126.3
7,589,043 B2 * 9/2009 Yoo ..................... H01M 4/8842
502/185
(Continued)

FOREIGN PATENT DOCUMENTS

JP 4351305 B2 * 10/2009 ............. B01J 23/42
JP 2010067509 A * 3/2010 ............. B01J 23/34
(Continued)

OTHER PUBLICATIONS

Bo Ki Hong et al., Journal of Power Sources 328 280-288 (2016).
(Continued)

*Primary Examiner* — Patricia L. Hailey
(74) *Attorney, Agent, or Firm* — Fox Rothschild LLP (57) ABSTRACT

Disclosed are a catalyst for an electrochemical cell and a method of manufacturing the catalyst. The catalyst includes a support, a first catalyst supported on the support, wherein the first catalyst is a catalyst for hydrogen oxidation reaction
(Continued)

(HOR) or oxygen reduction reaction (ORR), a second catalyst supported on the first catalyst, wherein the second catalyst is a catalyst for oxygen evolution reaction (OER), and a protective layer formed on the first catalyst and the second catalyst.

19 Claims, 5 Drawing Sheets

(51) Int. Cl.
| | |
|---|---|
| C25B 11/053 | (2021.01) |
| C25B 11/065 | (2021.01) |
| C25B 11/097 | (2021.01) |
| H01M 4/90 | (2006.01) |
| H01M 4/92 | (2006.01) |
| H01M 8/10 | (2016.01) |

(52) U.S. Cl.
CPC .......... C25B 11/065 (2021.01); C25B 11/097 (2021.01); H01M 4/8663 (2013.01); H01M 4/9075 (2013.01); H01M 4/921 (2013.01); H01M 4/926 (2013.01); H01M 2008/1095 (2013.01)

(58) Field of Classification Search
CPC ........ B01J 37/0244; B01J 37/12; B01J 37/14; C25B 11/097; C25B 11/065; C25B 9/19; C25B 11/053; H01M 4/8657; H01M 4/8663; H01M 4/9075; H01M 4/921; H01M 4/926; H01M 2008/1095
USPC .......... 502/101, 184, 185; 429/410; 428/403
See application file for complete search history.

(56) References Cited

U.S. PATENT DOCUMENTS

| | | | | |
|---|---|---|---|---|
| 8,334,080 | B2* | 12/2012 | Takei | H01M 4/926 |
| | | | | 429/526 |
| 8,617,770 | B2* | 12/2013 | Yan | H01M 4/92 |
| | | | | 429/488 |
| 9,005,331 | B2* | 4/2015 | Adzic | B82Y 30/00 |
| | | | | 75/255 |
| 2015/0357654 | A1* | 12/2015 | Merzougui | H01M 4/925 |
| | | | | 502/185 |
| 2017/0294669 | A1* | 10/2017 | Haugen | H01M 4/92 |

FOREIGN PATENT DOCUMENTS

| | | | | |
|---|---|---|---|---|
| JP | 2019-155355 | * | 9/2019 | ............ B01J 23/46 |
| JP | 2019-155355 A | | 9/2019 | |
| KR | 2011-0135305 | * | 12/2011 | ............ Y02E 60/50 |
| KR | 2011-0135305 A | | 12/2011 | |

OTHER PUBLICATIONS

Shanna D Knights et al., Journal Power Sources, 127, 127-134 (2004).

T. R. Ralph and M. P. Hogarth, Platinum Metal Review, 46, 117-135 (2002).

* cited by examiner

CATALYST FOR ELECTROCHEMICAL CELL AND METHOD OF MANUFACTURING SAME

CROSS REFERENCE TO RELATED APPLICATION

The present application claims priority to Korean Patent Application No. 10-2021-0053078, filed Apr. 23, 2021, the entire contents of which is incorporated herein for all purposes by this reference.

TECHNICAL FIELD

The present invention relates to a catalyst for electrolysis of an electrochemical cell and a method of manufacturing the same.

BACKGROUND

As automotive fuel cells, polymer electrolyte membrane fuel cells (PEMFCs) are typically used. The polymer electrolyte membrane fuel cell must reliably operate over a wide current density range to exhibit normal high output performance thereof (for example, at least a few tens of kW) in a variety of vehicle operating conditions. Typically, the polymer electrolyte membrane fuel cells are used in the form of a cell stack in which a plurality of unit cells is stacked to meet the required output power level. In the configuration of each unit cell, the innermost component is a membrane-electrode assembly (MEA). The MEA is composed of an electrolyte membrane that allows transport of hydrogen ions (protons), and an anode and a cathode applied onto both surfaces of the electrolyte membrane, respectively. Hereinbelow, the term "fuel cell" refers to a polymer electrolyte membrane fuel cell.

In addition, gas diffusion layers (GDLs) and gaskets are disposed on the outer surfaces of the MEA (i.e., the outer surface of each of the anode and the cathode). A separator or bipolar plate is attached to the outer surface of each of the respective GDLs to provide a flow field along which a reactive gas, coolant, and water that is a byproduct of a reaction flow. The electrical chemical reaction of the polymer electrolyte membrane fuel cells for electricity generation will be described below. Hydrogen supplied to the anode (oxidation electrode) of a fuel cell is split into hydrogen ions and electrons. The hydrogen ions move to the cathode (reduction electrode) via the polymer electrolyte membrane, and the electrons move to the cathode via an external circuit. Oxygen molecules, hydrogen ions, and electrons react together on the cathode to produce electricity and heat and produce water as a reaction by-product. The water produced during an electrochemical reaction in a fuel cell positively functions to maintain the moisture level of the MEA when the water exists in an adequate amount, but failure to appropriately remove excess water will result in "flooding" when the current density is high. The flooding hinders reaction gases from being introduced into fuel cells, resulting in considerable voltage loss.

Conventional techniques such as anode purge, hydrogen supply increase, hydrogen supply pressure increase, air supply increase, air supply pressure increase, etc., can deal with reversible deterioration modes such as flooding that is a phenomenon in which water collects or accumulates in a fuel cell stack and thus interferes with the flow of reactive gases such as hydrogen and oxygen in the air but cannot deal with irreversible deterioration modes. Cell voltage reversal which is a typical representative irreversible deterioration mode is attributed to insufficiency of hydrogen (fuel) on the anode, which occurs due to a variety of causes, such as flooding in fuel cells, ice generation in winter, and abnormalities in hydrogen fuel supplying devices. Cell voltage reversal is known to have a very fatal impact on the performance of fuel cells. That is, the voltage reversal has the problem of significantly reducing a cell voltage. Hydrogen shortages are classified into overall hydrogen starvation which refers to lacking in overall hydrogen supply throughout a fuel cell, and local hydrogen starvation which refers to a phenomenon in which the overall hydrogen supply to a fuel cell is sufficient, but hydrogen locally lacks due to uneven distribution of hydrogen throughout the fuel cell. The hydrogen starvation frequently occurs under specific conditions such as uneven supply and distribution of hydrogen gas, sudden increase in load to fuel cells, and start-up operation of fuel cells. When hydrogen starvation occurs on the anode, an anode voltage $V_{anode}$ increases. When the anode voltage continues to increase, the level of the anode voltage $V_{anode}$ eventually becomes higher than the level of the cathode voltage $V_{cathode}$, resulting in the reverse voltage state "$V_{cell}=V_{cathode}-V_{anode}<0$" in which the cell voltage $V_{cell}$ has a value less than zero (0). In the reverse voltage state attributable to in an increase in the anode voltage, a water electrolysis reaction represented by Equation 1 occurs.

$$H_2O \rightarrow \tfrac{1}{2}O_2 + 2H^+ + 2e^-, \ E^\circ=1.229 \ V \ (vs. \ SHE) \quad \text{[Equation 1]}$$

Where $E^\circ$ is the standard electrode potential, and SHE is the standard hydrogen electrode.

When the anode voltage subsequently continues to increase, carbon corrosion reaction on the anode is accelerated as shown in Formula 2 and Formula 3.

$$C+2H_2O \rightarrow CO_2+4H^++4e^-, \ E^\circ=0.207 \ V \ (vs. \ SHE) \quad \text{[Formula 2]}$$

$$C+H_2O \rightarrow CO+2H^++2e^-, \ E^\circ=0.518 \ V \ (vs. \ SHE) \quad \text{[Formula 3]}$$

When these cell reverse voltage conditions are maintained such that the cell voltage reaches an excessively low level (for example, below −2 V), the fuel cell will heat up and finally experience overall destruction of the membrane electrode assembly (MEA) and the gas diffusion layer (GDL). For example, pin holes occur in the MEA, resulting in the fuel cell being electrically shorted. This eventually leads to a cell failure condition in which the fuel cell cannot operate normally.

The overall hydrogen starvation can be relatively easily detected by monitoring the overall hydrogen supply to a fuel cell stack with sensors installed in a balance-of-plant (BOP) or the like. However, detection of the local hydrogen starvation occurring in some cells of a fuel cell stack requires much more effort and complex control systems because it can be accomplished by carefully monitoring the status of each cell in the fuel cell stack with a stack voltage monitoring unit.

Therefore, a fundamental solution to the problem is required. Conventionally, catalysts containing ruthenium or iridium or titanium components are added to the anode electrode to induce water splitting reaction rather than carbon corrosion reaction. In terms of performance for improvement in the voltage reversal, the ruthenium-containing catalyst, the iridium-containing catalyst and the titanium-containing catalyst are preferable in this order. However, the iridium-containing catalyst is most preferable in terms of balance of catalytic performance and durability. Further, to implement more stable fuel cell electric vehicles, the durability of catalyst in a voltage reversal condition needs to be improved. The invention is intended to improve the irreversible voltage reversal phenomenon with an exceptionally durable water electrolysis catalyst.

The invention also relates to polymer electrolyte membrane (PEM) electrolysis.

PEM electrolysis is a process of splitting water into hydrogen and oxygen through an electrochemical reaction that occurs under application of external electric energy. PEM electrolysis has been widely accepted as the next-generation pure-hydrogen production method due to the rapid hydrogen generation, high hydrogen purity, and flexible operational characteristics thereof. Moreover, when replacing the electric power supplied to the electrolysis system with green renewable energy such as solar energy, wind power energy, etc., hydrogen can be produced without environmental pollution and can be produced using surplus electric power, thereby maximizing the utilization of renewable energy.

Typically, for the PEM electrolysis, a cell stack in which a plurality of unit cells is stacked is used to meet the required output power level.

In the configuration of each unit cell of an electrolysis stack, a membrane-electrode assembly (MEA) is positioned innermost and composed of a perfluorinated sulfonic acid ionomer-based membrane allowing transport of protons, an anode, and a cathode in which the anode and the cathode are disposed on both sides of the MEA, respectively. The term "water electrolysis" refers to PEM electrolysis.

In addition, porous transport layers (PTLs), gas diffusion layers (GDLs), and gaskets are stacked outside the MEA. For example, the PTL, the GDL, and the gasket are disposed on the outer surface of each of the anode and the cathode. A separator or bipolar plate provided with a flow field along which reaction products and reactants flow or with an alternative structure to the flow field is placed to the outer side of the combination of the PTL and GDL.

The electrochemical reaction (electrolysis) occurs in the membrane-electrode assembly composed of the perfluorinated sulfonic acid ionomer, the anode, and the cathode. Water molecules supplied to the anode are split into oxygen, hydrogen ions (protons), and electrons. The protons move toward the cathode that serves as a reduction electrode via the membrane and the electrons move toward the cathode via an external circuit and a power supply. The protons and electrons react with each other on the cathode to produce hydrogen. For the reaction, the ruthenium-containing catalyst or the iridium-containing catalyst such as $IrO_2$ or $RuO_2$ is added to the anode and platinum-containing catalyst is added to the cathode.

However, the water splitting reaction through the PEM electrolysis may cause irreversible deterioration resulting in reduction in the performance of PEM electrolyte for some reasons such as dissolution of catalyst due to an acidic environment and a high operating voltage. Traditionally, ruthenium, iridium, or titanium catalyst, catalyst containing ruthenium, iridium, or titanium, or transition metal-added catalyst has been used as the catalyst for a PEM electrolyzer. However, for commercialization of PEM electrolyzer, it is required to improve the durability of catalyst for the anode.

Therefore, a fundamental solution is required to guarantee a stable implementation of PEM electrolysis, and the present invention is intended to solve the problem by providing an exceptionally durable catalyst for water electrolysis.

SUMMARY OF THE INVENTION

In preferred aspects, provided is a catalyst for an electrochemical cell, and the catalyst may prolong the lifespan of the electrochemical cell.

However, the objectives of the present invention are not limited the one described above. The objectives of the present invention will become more apparent from the following description and will be realized with components recited in the claims and combinations of the components.

In an aspect, provided is a catalyst for an electrochemical cell. The catalyst includes: a support; a first catalyst supported on the support, wherein the first catalyst is a catalyst for hydrogen oxidation reaction (HOR) or oxygen reduction reaction (ORR); a second catalyst supported on at least one of the support and the first catalyst, wherein the second catalyst is a catalyst for oxygen evolution reaction (OER); and a protective layer formed on at least one of the first catalyst and the second catalyst.

The second catalyst may be supported on the first catalyst, and the protective layer may be formed on the surface of each of the first and second catalysts.

The second catalyst may be supported on the support and the protective layer may be formed on the surface of each of the first and second catalysts.

The second catalyst may include one or more selected from the group consisting of ruthenium (Ru), iridium (Ir), titanium (Ti), and oxides thereof.

The protective layer may include one or more selected from the group consisting of titanium oxide ($TiO_x$), zinc oxide ($ZnO_x$), copper oxide ($CuO_x$), silicon (Si), nickel (Ni), iron (Fe), and graphitic carbon nitride. x is between 1 and 3

The protective layer may have a thickness of about 0.8 to 5 nm.

In an aspect, provided is a method of manufacturing of a catalyst. The method includes: preparing starting material including a support and a first catalyst supported on the support; introducing the starting material into a rotary reactor of an atomic layer deposition (ALD) device; vaporizing a precursor of a second catalyst and introducing the vaporized precursor of the second catalyst into the rotary reactor using a carrier gas; causing a first reaction while rotating the rotary reactor such that the precursor of the second catalyst reacts on the first catalyst; removing residual gas present in the rotary reactor using a purging gas; introducing a reductant into the rotary reactor to reduce the resultant of the first reaction such that the second catalyst is supported on the first catalyst; removing residual gas present in the rotary reactor using a purging gas; vaporizing a precursor of a protective layer and introducing the vaporized precursor into the rotary reactor using a carrier gas; causing a second reaction while rotating the rotary reactor such that a precursor layer made of the precursor of the protective layer is formed on the surface of each of the first catalyst and the second catalyst; and introducing an oxidant into the rotary reactor to oxidize the resultant of the second reaction such that the protective layer is formed on the surface of each of the first catalyst and the second catalyst.

The carrier gas may be fed at a flow rate of about 100 to 1000 mL/min to introduce the precursor of the second catalyst into the rotary reactor.

The first reaction may be performed under conditions in which the rotation speed of the rotary reactor is in a range of about 30 to 60 rpm, the temperature of the rotary reactor is in a range of about 200° C. to 360° C., and a reaction duration is in a range of about 2 to 30 seconds.

The carrier gas may be fed at a flow rate of about 100 to 1000 mL/min to introduce the vaporized precursor of the protective layer into the rotary reactor.

The second reaction may be performed under conditions in which the rotation speed of the rotary reactor is in a range of about 30 to 60 rpm, the temperature of the rotary reactor is in a range of 7 about 0° C. to 250° C., and a reaction duration is in a range of about 2 to 30 seconds.

The method further includes a step of introducing an oxidant into the rotary reactor after completion of the second reaction to oxidize the reaction product of the second reaction.

The oxidant may include one or more selected from the group consisting of water vapor ($H_2O$), oxygen ($O_2$), and ozone ($O_3$).

The starting material may include a self-assembled monolayer (SAM) formed on only the surface of the first catalyst supported on the support.

After the second catalyst is supported on the starting material, the resultant may be thermally treated at the atmospheric pressure to remove the self-assembled monolayer formed on the surface of the first catalyst.

Also provided is a vehicle that includes the catalyst manufactured by the methods described herein.

According to various exemplary embodiments of the present invention, the catalyst for an electrochemical cell may include a protective layer formed on a catalyst that is active in oxygen evolution reaction (OER). Particularly, the catalyst may conduct initial performance level of a cell to be maintained and reducing deterioration of the cell.

According to various exemplary embodiments of the present invention, the catalyst for an electrochemical cell may have improved dispersibility and uniformity because it is structured such that a catalyst that is active in oxygen evolution reaction (OER) is supported on a catalyst that is active in hydrogen oxidation reaction (HOR) or oxygen reduction reaction (ORR) and which is uniformly distributed in a nano-size order.

According to various exemplary embodiments of the present invention, the catalyst for an electrochemical cell may include a protective layer that can improve the lifespan of a cell.

However, the advantages of the present invention are not limited the ones described above. It should be understood that the advantages of the present invention include all effects that can be inferred from the description given below.

Other aspects of the invention are disclosed infra.

BRIEF DESCRIPTION OF THE DRAWINGS

The above and other objectives, features, and other advantages of the present invention will be more clearly understood from the following detailed description taken in conjunction with the accompanying drawings, in which.

DETAILED DESCRIPTION

Above objectives, other objectives, features, and advantages of the present invention will be readily understood from the following preferred embodiments associated with the accompanying drawings. However the present invention is not limited to the embodiments described herein and may be embodied in other forms. The embodiments described herein are provided so that the disclosure can be made thorough and complete and that the spirit of the present invention can be fully conveyed to those skilled in the art.

Throughout the drawings, like elements are denoted by like reference numerals. In the accompanying drawings, the dimensions of the structures are larger than actual sizes for clarity of the present invention. Terms used in the specification, "first", "second", etc., may be used to describe various components, but the components are not to be construed as being limited to the terms. These terms are used only for the purpose of distinguishing a component from another component. For example, a first constitutive element may be referred as a second constitutive element, and the second constitutive element may be also referred to as the first constitutive element. As used herein, the singular forms "a", "an", and "the" are intended to include the plural forms as well unless the context clearly indicates otherwise.

It will be further understood that the terms "comprise", "includes", or "has" when used in this specification specify the presence of stated features, regions, integers, steps, operations, elements and/or components, but do not preclude the presence or addition of one or more other features, regions, integers, steps, operations, elements, components and/or combinations thereof. It will also be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
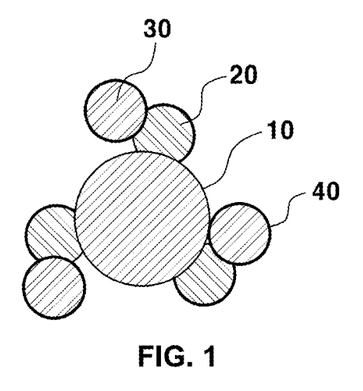
FIG. 1 shows an exemplary catalyst for an exemplary electrochemical cell according to an exemplary embodiment of the present invention.

FIG. 1 shows an exemplary catalyst for an electrochemical cell according to an exemplary embodiment of the present invention. The catalyst includes a support 10, a first catalyst 20 that is active in hydrogen oxidation reaction (HOR) or oxygen reduction reaction (ORR) and which is supported on the support 10, a second catalyst 30 that is supported on the first catalyst 20 and which is active in oxygen evolution reaction (OER), and protective layers 40 provided on the surfaces of the first and second catalysts 20 and 30, respectively.

The support 10 may be made from carbon black, carbon nanotubes, graphite, and graphene.

The first catalyst 20 that is active in hydrogen oxidation reaction (HOR) or oxygen reduction reaction (ORR) may be made from one or more materials selected from the group consisting of platinum, gold, ruthenium, osmium, palladium, platinum-ruthenium alloys, platinum-osmium alloys, and platinum-palladium alloys.

The second catalyst 30 that is active in oxygen generation reaction (OER) may be made from at least one material selected from the group consisting of ruthenium (Ru) series, iridium (Ir) series, and titanium (Ti) series. For fuel cells the second catalyst 30 present in the electrode of an electrochemical cell induces a water splitting reaction when a high voltage is formed in the anode due to insufficient hydrogen, thereby reducing damage to the catalyst and electrode.

The present invention features the structure in which the second catalyst 30 may be supported on the first catalyst 20. In particular, with the structure in which the second catalyst 30 may be formed on the surface of the nano-sized first catalyst 20, the dispersibility and uniformity of the second catalyst 30 are greatly improved. This structure may prevent damage to the membrane-electrode assembly (MEA) and missing of the first catalyst 20 due to corrosion of the support 10 when the fuel cell suffers a voltage reversal environment. In addition, it is possible to improve the water electrolysis performance of a water electrolysis device due to the high dispersibility of the second catalyst 30. Moreover, since the second catalyst 30 is deposited on the first catalyst 20 through an atomic layer deposition (ALD) process so that the second catalyst 30 and the first catalyst 20 are formed as an integrated body, the second catalyst 30 may have increased dispersibility, electrical conductivity, and binding force. In addition, since the second catalyst 30 may be strongly bound to the first catalyst 20 in the present invention, the catalyst loss may be reduced in comparison with a related art in which a second catalyst that is in active in oxygen revolution reaction is simply mixed with a first catalyst such as a Pt/C catalyst.

However, even such a structure may encounter irreversible deterioration such as the reduced activity of the catalyst or ionization and release of some catalytic metals, depending on the acidic environment and operating voltage. In particular, the protective layer 40 that has several nanometers thickness may be formed on the surface of each of the first catalyst 20 and the second catalyst (30) to minimize structural changes and deterioration of the catalyst while maintaining the performance of the catalyst.

The protective layer 40 may include at least one selected from the group consisting of titanium oxide (($TiO_x$), zinc oxide ($ZnO_x$), copper oxide (($CuO_x$), silicon (Si), nickel (Ni), iron (Fe), graphitic carbon nitride, and combinations thereof x is between 1 and 3. Preferably, x is 1, 1.5, or 2.

The protective layer 40 may have a thickness in a range of about 0.8 to 5 nm, or in a range of about 0.8 to 3 nm. When the thickness of the protective layer 40 above is less than about 0.8 nm, the effect of reducing deterioration of the catalyst is not substantial. On the other hand, when it is greater than about 5 nm, the performance of the catalyst may be reduced.

A method of manufacturing the catalyst described above includes: a preparation step of preparing a starting material including a support and a first catalyst supported on the support; a first feeding step of introducing the starting material into a rotary reactor of an ALD device; a second feeding step of vaporizing a precursor of a second catalyst and introducing the vaporized precursor of the second catalyst into the rotary reactor using a carrier gas; a first reaction step of causing a first reaction while rotating the rotary reactor such that the precursor of the second catalyst reacts on the first catalyst; a first purging step of removing residual gas present in the rotary reactor using a purging gas; a supporting step of introducing a reductant into the rotary reactor to reduce the resultant of the first reaction such that the second catalyst is supported on the first catalyst; a second purging step of removing residual gas present in the rotary reactor using a purging gas; a third feeding step of vaporizing a precursor of a protective layer and introducing the vaporized precursor into the rotary reactor using a carrier gas; a second reaction step of causing a second reaction while rotating the rotary reactor such that a precursor layer made from the precursor of the protective layer is formed on the surface of each of the first catalyst and the second catalyst; and a protective layer formation step of introducing an oxidant into the rotary reactor to oxidize the resultant of the second reaction such that the protective layer is formed on the surface of each of the first catalyst and the second catalyst.

In particular, the method includes using a powder-type atomic layer deposition device equipped with a rotary reactor to produce a catalyst. In particular, when the second catalyst and protective layer are deposited, the reactor may be turned to allow the powder-type catalyst to form smoothly. To achieve the purpose of the present invention, the protective layer needs to be formed in a thickness of several nanometers. However, it is difficult to uniformly form such a thin protective layer with a wet process that is used in manufacturing conventional fuel cells or in synthesizing conventional electrolysis catalysts. On the other hand, such a thin protective layer can be formed with an atomic layer deposition (ALD) device because the thickness of a deposited layer can be finely controlled with the ALD device. However, there is a problem in that the ALD device is suitable for formation of a flat film but is not suitable for formation of a uniform layer on surface of particles. For example, a powder-type atomic layer deposition device equipped with a rotary reactor may be used to synthesize a particle-type catalyst, and a protective layer having a thickness of several nanometers is formed on the surface of the catalyst.

First, a starting material composed of a support and a first catalyst supported on the support may be introduced into the rotary reactor. The precursor of a second catalyst may be positioned at the preceding stage of the rotary reactor and is vaporized at a temperature in a range of about 50° C. to 100° C. The precursor of the second catalyst is not specifically limited, and any material that has been widely used in the related art to which this invention pertains can be used as the precursor of the second catalyst.

The vaporized precursor of the second catalyst may be fed into the rotary reactor by introducing a carrier gas such as argon gas or nitrogen gas into the rotary reactor at a flow rate in a range of about 100 to 1,000 mL/min, or in a range of about 150 to 300 mL/min. The reason for the injection of the carrier gas is to secure a predetermined feed flow rate of the precursor of the second catalyst, thereby evenly forming the second catalyst on each particle of the starting material. When the flow rate of the carrier gas is less than about 100 mL/min, the first reaction may not uniformly occur. On the contrary, when the flow rate of the carrier gas is greater than about 1,000 mL/min, the precursor of the second catalyst may enter the rotary reactor in the form of particles before the precursor of the second catalyst is vaporized, thereby causing contamination, or preventing uniform reaction in the rotary reactor.

When the vaporized precursor of the second catalyst is injected into the rotary reactor, the feeding of the carrier gas may be stopped, and the starting material and the precursor of the second catalyst may undergo the first reaction.

The first reaction may be performed under conditions in which the rotation speed of the rotary reactor is in a range of about 30 to 60 rpm, the temperature of the rotary reactor may be in a range of about 200° C. to 360° C., and the reaction duration is in a range of about 2 to 30 seconds. The first reaction may not sufficiently occur with the reaction duration being less than about 2 seconds. On the other hand, when the reaction duration is greater than about 30 seconds, a total reaction cycle may be unnecessarily prolonged and thus it is not desirable in cost effectiveness. With the rotation speed being less than about 30 rpm, the second catalyst may not be evenly formed. On the other hand, the rotation speed is greater than about 60 rpm allows the starting material to agglomerate, thereby hindering the second catalyst from being formed on the first catalyst.

After the completion of the first reaction, a purge gas such as argon gas or nitrogen gas is fed into the rotary reactor at a flow rate in a range of about 100 to 1000 mL/min to eliminate residual precursors, reaction byproducts, etc. present in the rotary reactor. When the flow rate of the purge gas is less than about 100 mL/min, the residues may not be completely removed. On the other hand, when it is greater than about 1000 mL/min, the reaction product may be lost due to an excessively high flow rate.

In the manufacturing method, after the completion of the first reaction, a reductant may be introduced into the rotary reactor so that the reaction product of the first reaction can be reduced. This process is optional.

The reductant may include at least one material selected from the group consisting of hydrogen ($H_2$), oxygen ($O_2$), ammonia ($NH_3$), water vapor ($H_2O$), other reactants, and combinations thereof.

The process described above may be repeated until the second catalyst in the desired quantity is formed on the first catalyst.

Next, for formation of the protective layer, the precursor of the protective layer may be placed at the preceding stage to the rotary reactor and is vaporized at a temperature in a range of about 50° C. to 100° C. The precursor of the protective layer is not specifically limited, and any material that has been widely used in the related art to which this invention pertains can be used as the precursor of the protective layer. For example, in the case of forming a protective layer containing titanium oxide, titanium isopropoxide may be used as the precursor of the protective layer.

The vaporized precursor of the protective layer is fed into the rotary reactor by introducing a carrier gas such as argon gas or nitrogen gas into the rotary reactor at a flow rate in a range of about 100 to 1000 mL/min, or in a range of about 150 to 300 mL/min. The reason for the injection of the carrier gas is to make the feed flow rate of the precursor of the protective layer constant such that the protective layer can be evenly formed on the surface of each of the first and second catalysts. When the flow rate of the carrier gas is less than about 100 mL/min, the second reaction may not uniformly occur. On the contrary, when the flow rate of the carrier gas is greater than about 1000 mL/min, the precursor of the protective layer may enter the rotary reactor in the form of particles before the precursor of the protective layer is vaporized, thereby causing contamination, or preventing uniform reaction in the rotary reactor.

When the vaporized precursor of the protective layer is injected into the rotary reactor, the feeding of the carrier gas may be stopped, and the reaction product of the first reaction and the precursor of the protective layer may undergo the second reaction.

The second reaction may be performed under conditions in which the rotation speed of the rotary reactor is in a range of about 30 to 60 rpm, the temperature of the rotary reactor is in a range of about 70° C. to 250° C., and the reaction duration is in a range of about 2 to 30 seconds. The second reaction may not sufficiently occur with the reaction duration being shorter than 2 seconds. On the other hand, when the reaction duration is greater than about 30 seconds, a total reaction cycle is unnecessarily prolonged and thus it is not desirable in cost effectiveness. With the rotation speed being less than about 30 rpm, the protective layer may not be evenly formed. On the other hand, the rotation speed is greater than about 60 rpm allows the reaction product of the first reaction to agglomerate, thereby hindering the protective layer from being formed.

After the completion of the second reaction, a purge gas such as argon gas or nitrogen gas is fed into the rotary reactor at a flow rate in a range of about 100 to 1000 mL/min to eliminate residual precursors, reaction byproducts, etc. present in the rotary reactor. When the flow rate of the purge gas is less than about 100 mL/min, the residues may not be completely removed. On the other hand, when it is greater than about 1000 mL/min, the reaction product may be lost due to an excessively high flow rate.

After the completion of the second reaction, an oxidant may be introduced into the rotary reactor so that the reaction product of the second reaction can be oxidized. This process is optional.

The oxidant includes at least one material selected from the group consisting of water vapor ($H_2O$), oxygen ($O_2$), ozone ($O_3$), and combinations thereof.

The process described above may be repeated until the protective layer with the desired thickness may be formed on the surface of each of the first catalyst and the second catalyst.

As a specific implementation example, a catalyst for an electrochemical cell was prepared using a method described below.

As a starting material, a Pt/C structure (HISPEC4000 grade produced by Johnson Matthey in the United Kingdom) was introduced into a rotary reactor of a powder-type atomic layer deposition device. The Pt/C structure means a platinum catalyst supported on a carbon support.

A ruthenium precursor (Carish produced by TANAKA Kikinzoku Kogyo in Japan) was placed at the preceding stage to the rotary reactor and vaporized. The vaporized ruthenium precursor was injected into the rotary reactor with the use of a carrier gas. The Pt/C and the ruthenium precursor were reacted under the first reaction conditions described above so that ruthenium (Ru) was supported on platinum (Pt).

The residual gas was removed with a purge gas after sufficient reaction between the Pt/C and the ruthenium precursor was completed.

Subsequently, oxygen ($O_2$) as a reductant for ruthenium (Ru) was injected into the rotary reactor to reduce the ruthenium precursor that had reacted with the Pt/C so that a ruthenium catalyst was formed. The oxygen ($O_2$) served as a ligand remover for the ruthenium precursor.

The process described above was repeated about 900 times to obtain the reaction product "Ru (Pt)/C" which means a structure in which ruthenium as a second catalyst is supported on platinum that serves as the first catalyst.

Next, titanium isopropoxide that was a precursor of a protective layer was placed at the preceding stage to the rotary reactor and then vaporized. The vaporized titanium isopropoxide was injected into the rotary reactor with the use of a carrier gas. The titanium isopropoxide and the Ru (Pt)/C were reacted to form a series of layers containing titanium on the surface of each of the ruthenium catalyst and the platinum catalyst.

After the completion of sufficient reaction between the precursor of the protective layer and the Ru (Pt)/C, residual gas was purged by a purging gas. To oxidize titanium, water vapor was injected as an oxidant. Thus, a protective layer containing titanium oxide ($TiO_x$) was formed.

The process was repeated 42 times, and eventually the catalyst according to the present invention was obtained.

Figure 2:
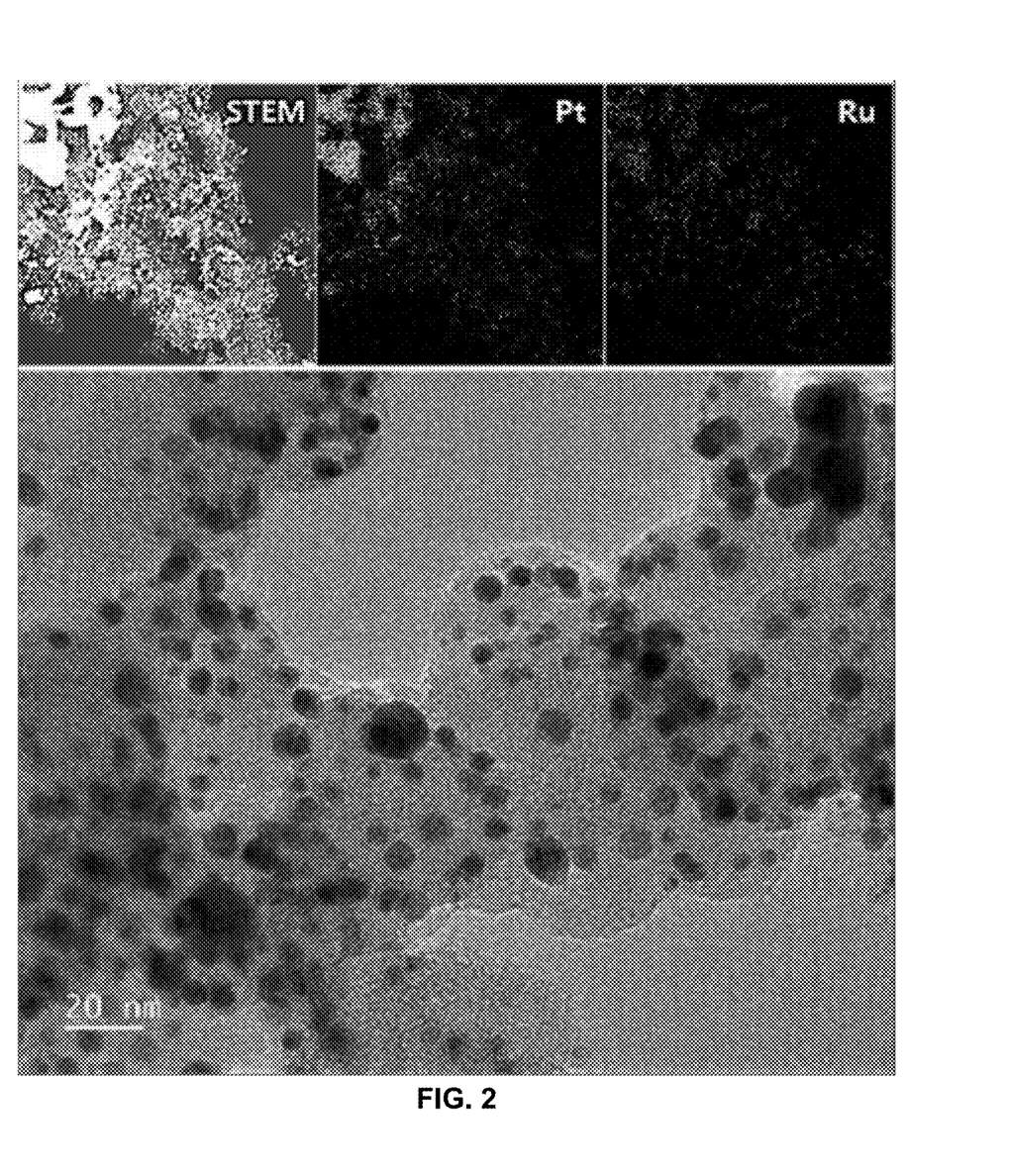
FIG. 2 shows the result of IEM-EDS analysis of the catalyst according to an exemplary embodiment of the present invention.
Figure 3:
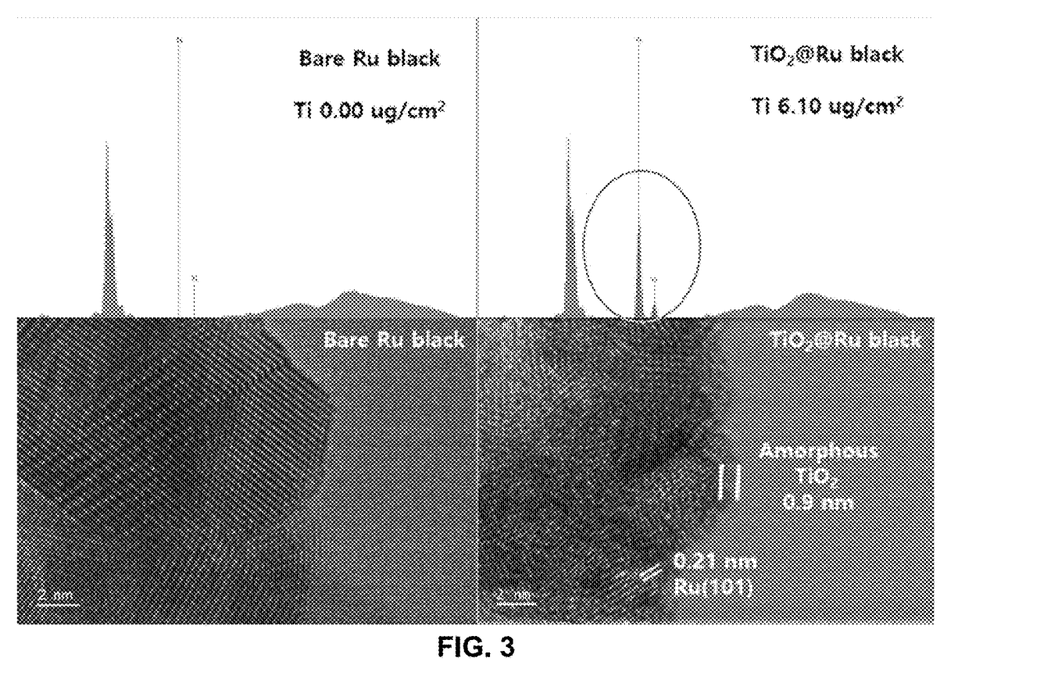
FIG. 3 shows the results of XRF analysis and TEM analysis of the catalyst according to an exemplary embodiment of the present invention.

FIG. 2 shows the result of TEM-EDS analysis of the catalyst according to an exemplary embodiment of the present invention. FIG. 3 shows the results of XRF analysis and TEM analysis of the catalyst according to an exemplary embodiment of the present invention. As shown in FIGS. 2 and 3, a $TiO_x$ protective layer was formed on the Ru (Pt)/C structure and the ruthenium.

Herein, a sample of the catalyst prepared according to exemplary embodiments of the present invention and a sample of the bare Ru (Pt)/C that was not covered with the protective layer are referred to as Example and Comparative Example, respectively for the purpose description. The durability test was performed on Example and Comparative example using a method described below.

Figure 4A:
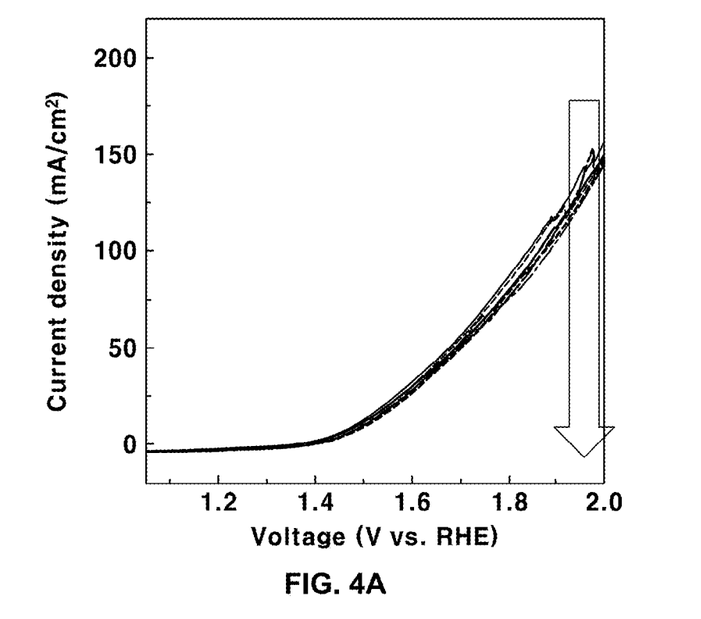
FIG. 4A shows the result of current density measurement in an example of the present invention.
Figure 4B:
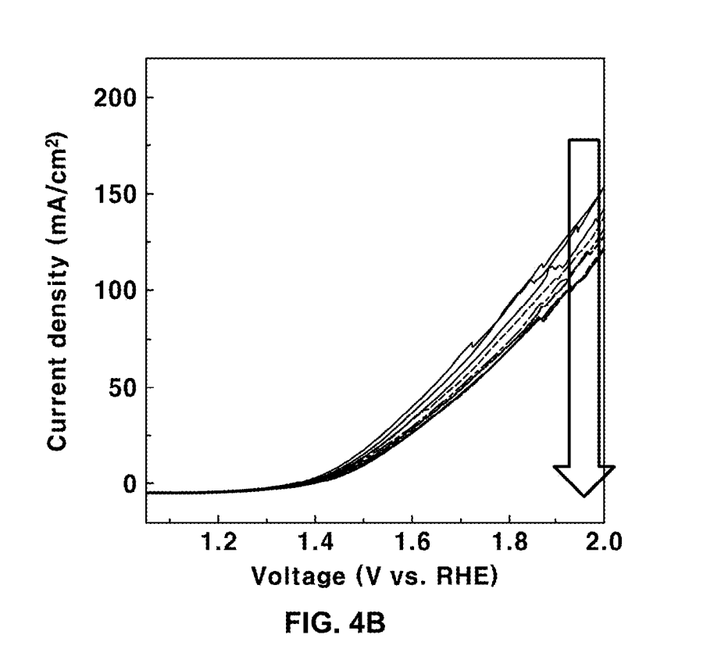
FIG. 4B shows the result of current density measurement in a comparative example.

Linear sweep voltammetry (LSV) was conducted on under 0.1 M of $HClO_4$ solution for Example and Comparative Example, in which a reference electrode was Ag/AgCl, a working electrode was Au, and a counter electrode was Pt mesh. The current density was measured at 2 V for Example and Comparative Example. FIG. 4A shows the analysis result for Example, and the 4B is the analysis result for Comparative Example. As shown in FIGS. 4A and 4B, Example and Comparative Example exhibit similar levels of current density at 2 V in an early stage of evaluation, but Example exhibits a relatively high level of current density in comparison with Comparative Example after repeated durability test cycles. The results are summarized in Table 1.

TABLE 1

| Category | Current density ($mA/cm^2$ at 2 V) | |
|---|---|---|
| | Early stage | After repeat of durability test cycles |
| Example | 157.36 | 143.85 |
| Comparative Example | 156.28 | 120.68 |

From the results, Example maintained the initial performance and the durability because the protective layer of several nanometers formed on the surface of each of the first catalyst and the second catalyst reduces deterioration of the performance of the catalyst.

Figure 5:
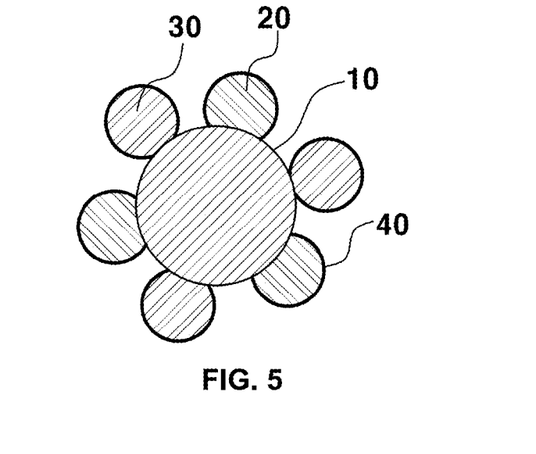
FIG. 5 shows an exemplary catalyst for an electrochemical cell according to an exemplary embodiment of the present invention.

FIG. 5 shows an exemplary catalyst for an electrochemical cell according to an exemplary embodiment of the present invention. The catalyst may include a support 10, a first catalyst 20 that is active in hydrogen oxidation reaction (HOR) or oxygen reduction reaction (ORR) and which is supported on the support 10, a second catalyst 30 that is supported on the support and which is active in oxygen evolution reaction (OER), and protective layers 40 provided on the surfaces of the first and second catalysts 20 and 30, respectively.

The catalyst according to an exemplary embodiment was the implementation of a catalyst in which the second catalyst 30 was grown only on the surface of the support. This catalyst may have the effect of maximizing the surface area over which electrolysis reaction occurs.

To form the second catalyst 30 only on the surface of the support 10, a self-assembled monolayer (SAM) may be formed on the surface of the first catalyst 20 as the starting material. In particular, a self-assembled monolayer (SAM) may be formed on the surface of the first catalyst 20 to make the second catalyst 30 deposited on the defective side of the support 10.

Examples of the material of the SAM include octadecanethiol (ODT) and dodecanethiol (DDT) but are not limited thereto.

The catalyst according to an exemplary embodiment may maximize the oxygen reduction reaction (ORR) and the hydrogen oxidation reaction (HOR) of the first catalyst and the oxygen evolution reaction (OER) of the second catalyst. In addition, the second catalyst may protect the surface defects of the support, thereby preventing the support from being corroded.

A method of manufacturing the catalyst according to an exemplary second embodiment may include: a preparation step of preparing a starting material composed of a support, a first catalyst formed on the support, and a self-assembled monolayer (SAM) formed on the surface of the first catalyst; a first feeding step of introducing the starting material into a rotary reactor of a powder-type atomic layer deposition (ALD) device; a second feeding step of vaporizing a precursor of a second catalyst and introducing the vaporized precursor of the second catalyst into the rotary reactor using a carrier gas; a first supporting step of causing a first reaction while rotating the rotary reactor to allow the second catalyst to be supported on the support; a purging step of removing residual gas in the rotary reactor using a purging gas; a second supporting step of introducing a reductant into the rotary reactor to reduce the precursor of the second catalyst so that the second catalyst is supported on the first catalyst; a heat treatment step of treating the resulting structure at a temperature in a range of 250° C. to 300° C. at the atmospheric pressure for a duration equal to or shorter than 30 minutes to remove the self-assembled monolayer (SAM) from the reaction product of the first reaction; a third feeding step of vaporizing a precursor of a protective layer and introducing the vaporized precursor into the rotary reactor using a carrier gas; and a second reaction step of causing a second reaction while rotating the rotary reactor to form the protective layer on the surface of the first catalyst and the second catalyst.

In particular, by repeating the processes described above, the catalyst "Ru—Pt/C" in which the protective layer is formed on ruthenium (Ru) and platinum (Pt) is obtained.

Figure 6:
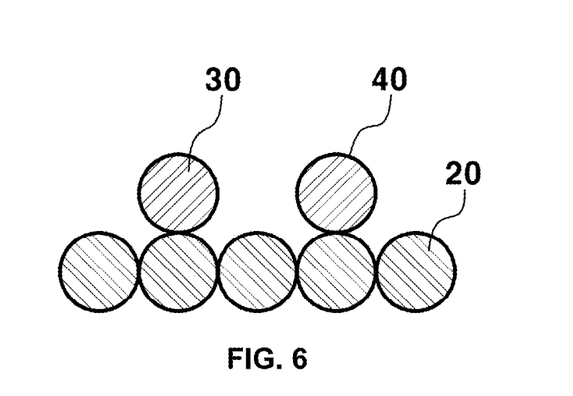
FIG. 6 shows an exemplary catalyst for an electrochemical cell according to an exemplary embodiment of the present invention.

FIG. 6 is a diagram illustrating an exemplary catalyst for an electrochemical cell according to an exemplary embodiment of the present invention. As shown in FIG. 6, the catalyst according to an exemplary embodiment may include a first catalyst 20 that is active in hydrogen oxidation reaction (HOR) or oxygen reduction reaction (ORR), a second catalyst 30 that is supported on the first catalyst 20 and which is active in oxygen evolution reaction (OER), and protective layers 40 provided on the surfaces of the first and second catalysts 20 and 30, respectively.

A method of manufacturing the catalyst according to an exemplary embodiment may include: a preparation step of preparing a starting material including a first catalyst; a first feeding step of introducing the starting material into a rotary reactor of a powder-type ALD device; a second feeding step of vaporizing a precursor of a second catalyst and introducing the vaporized precursor of the second catalyst into the rotary reactor using a carrier gas; a first reaction step of causing a first reaction to occur while rotating the rotary reactor; a first purging step of removing residual gas present in the rotary reactor using a purging gas; a supporting step of introducing a reductant into the rotary reactor to reduce the precursor of the second catalyst such that the second catalyst is supported on the first catalyst; a second purging step of removing residual gas present in the rotary reactor using a purging gas; a third feeding step of vaporizing a precursor of a protective layer and introducing the vaporized precursor into the rotary reactor using a carrier gas; and a second reaction step of causing a second reaction to occur while rotating the rotary reactor such that the protective layer is formed on the surface of each of the first catalyst and the second catalyst.

Figure 7:
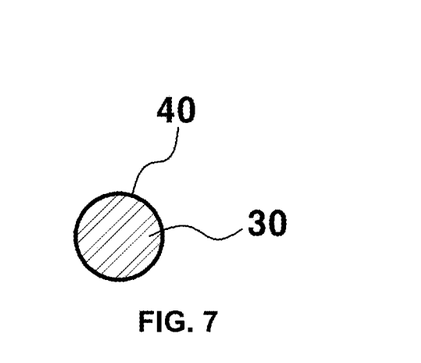
FIG. 7 shows an exemplary catalyst for an electrochemical cell according to an exemplary embodiment of the present invention.

FIG. 7 shows an exemplary catalyst for an electrochemical cell according to an exemplary embodiment of the present invention. The catalyst according to an exemplary embodiment may include a second catalyst 30 that is active in oxygen evolution reaction (OER) and a protective layer 40 formed on the surface of the second catalyst 30.

A method of manufacturing the catalyst according to an exemplary embodiment may include: a preparation step of preparing a starting material including a second catalyst; a feeding step of vaporizing a precursor of a protective layer and introducing the vaporized precursor into a rotary reactor; a second reaction step of causing a second reaction while rotating the rotary reactor to form the protective layer on the surface of the second catalyst.

While various exemplary embodiments of the present invention have been described with reference to the accompanying drawings, those skilled in the art will appreciate that the present invention can be implemented in other different forms without departing from the technical spirit or essential characteristics of the exemplary embodiments. Therefore, it can be understood that the exemplary embodiments described above are only for illustrative purposes and are not restrictive in all aspects.

What is claimed is:

1. A catalyst for an electrochemical cell, the catalyst comprising:
 a support;
 a first catalyst supported on the support, wherein the first catalyst is a catalyst for a hydrogen oxidation reaction (HOR) or oxygen reduction reaction (ORR);
 a second catalyst, in the form of particles, deposited on the first catalyst, and wherein the second catalyst is a catalyst for an active oxygen evolution reaction (OER); and
 a protective layer formed on the first catalyst and the second catalyst.

2. The catalyst according to claim 1, wherein the second catalyst is supported on the support, and the protective layer is formed on the first catalyst and the second catalyst.

3. The catalyst according to claim 1, wherein the second catalyst comprises one or more selected from the group consisting of ruthenium (Ru), iridium (Ir), titanium (Ti), and oxides thereof.

4. The catalyst according to claim 1, wherein the protective layer comprises one or more selected from the group consisting of titanium oxide ($TiO_x$), zinc oxide ($ZnO_x$), copper oxide ($CuO_x$), silicon (Si), nickel (Ni), iron (Fe), and graphitic carbon nitride, wherein x is between 1 and 3.

5. The catalyst according to claim 1, wherein the protective layer has a thickness of about 0.8 to 5 nm.

6. A method of manufacturing a catalyst for an electrochemical cell, the method comprising:
 preparing a starting material in which a first catalyst that is active in hydrogen oxidation reaction (HOR) or oxygen reduction reaction (ORR) is supported on a support;
 introducing the starting material into a reactor of a powder-type atomic layer deposition (ALD) device;
 vaporizing a precursor of a second catalyst that is active in oxygen evolution reaction (OER) and introducing the vaporized precursor of the second catalyst into the rotary reactor using a carrier gas;
 causing a first reaction while rotating the rotary reactor such that the precursor of the second catalyst reacts on the first catalyst;
 removing residual gas in the rotary reactor using a purging gas;
 introducing a reductant into the rotary reactor to reduce the reaction product of the first reaction such that the second catalyst is supported on the first catalyst;
 removing residual gas in the rotary reactor using a purging gas;
 vaporizing a precursor of a protective layer and introducing the vaporized precursor of the protective layer into the rotary reactor;

causing a second reaction while rotating the rotary reactor such that the precursor of the protective layer is formed on at least one of the first catalyst and the second catalyst; and introducing an oxidant into the rotary reactor to oxidize the reaction product of the second reaction such that a protective layer is formed on the first catalyst and the second catalyst.

7. The method according to claim 6, wherein the second catalyst is supported on the first catalyst, and the protective layer is formed on the first catalyst and the second catalyst.

8. The method according to claim 6, wherein the second catalyst comprises one or more selected from the group consisting of ruthenium (Ru), iridium (Ir), titanium (Ti), and oxides thereof.

9. The method according to claim 6, wherein the carrier gas is fed at a flow rate of about 100 to 1000 mL/min to introduce the precursor of the second catalyst into the rotary reactor.

10. The method according to claim 6, wherein the first reaction is performed under conditions in which the rotation speed of the rotary reactor is in a range of about 30 to 60 rpm, the temperature of the rotary reactor is in a range of about 200° C. to 360° C., and a reaction duration is in a range of about 2 to 30 seconds.

11. The method according to claim 6, wherein the protective layer comprises one or more selected from the group consisting of titanium oxide ($TiO_x$), zinc oxide ($ZnO_x$), copper oxide ($CuO_x$), silicon (Si), nickel (Ni), iron (Fe), and graphitic carbon nitride, wherein x is between 1 and 3.

12. The method according to claim 6, wherein the carrier gas is fed at a flow rate of about 100 to 1000 mL/min to introduce the vaporized precursor of the protective layer into the rotary reactor.

13. The method according to claim 6, wherein the second reaction is performed under conditions in which the rotation speed of the rotary reactor is in a range of about 30 to 60 rpm, the temperature of the rotary reactor is in a range of about 70° C. to 250° C., and a reaction duration is in a range of about 2 to 30 seconds.

14. The method according to claim 6, further comprising:

introducing an oxidant into the rotary reactor after completion of the second reaction to oxidize the reaction product of the second reaction.

15. The method according to claim 14, wherein the oxidant comprises one or more material selected from the group consisting of water vapor ($H_2O$), oxygen ($O_2$), and ozone ($O_3$).

16. The method according to claim 6, wherein the protective layer has a thickness of about 0.8 to 5 nm.

17. The method according to claim 6, wherein the starting material comprises a self-assembled monolayer (SAM) formed on only the surface of the first catalyst supported on the support.

18. The method according to claim 17, wherein the second catalyst is supported on the support, and the protective layer is formed on the first catalyst and the second catalyst.

19. The method according to claim 17, wherein the second catalyst is supported on the starting material, and is thermally treated at the atmospheric pressure to remove the self-assembled monolayer formed on the surface of the first catalyst.

* * * * *